US012060948B1

(12) United States Patent
Frazier, II

(10) Patent No.: US 12,060,948 B1
(45) Date of Patent: Aug. 13, 2024

(54) AUTOMATIC DRAINAGE DEVICE FOR RADON MITIGATION SYSTEMS

(71) Applicant: James Warren Frazier, II, Ann Arbor, MI (US)

(72) Inventor: James Warren Frazier, II, Ann Arbor, MI (US)

( * ) Notice: Subject to any disclaimer, the term of this patent is extended or adjusted under 35 U.S.C. 154(b) by 60 days.

(21) Appl. No.: 18/171,830

(22) Filed: Feb. 21, 2023

(51) Int. Cl.
*F16K 31/26* (2006.01)
*E02D 31/00* (2006.01)
*F16K 24/04* (2006.01)

(52) U.S. Cl.
CPC .......... *F16K 24/048* (2013.01); *E02D 31/008* (2013.01); *F16K 31/26* (2013.01)

(58) Field of Classification Search
CPC ............. E03F 5/0402; Y10T 137/3068; E03D 31/008; F16K 31/24; F16K 31/26; F16K 31/265
See application file for complete search history.

(56) References Cited

U.S. PATENT DOCUMENTS

| 2,702,045 | A | * | 2/1955 | Graefe | F16T 1/24 251/215 |
| 5,419,359 | A | * | 5/1995 | Kor | E03F 5/0402 137/448 |
| 6,626,201 | B1 | * | 9/2003 | Kim | E03F 5/042 137/202 |

FOREIGN PATENT DOCUMENTS

WO WO-2019211699 A1 * 11/2019

* cited by examiner

*Primary Examiner* — Hailey K. Do
(74) *Attorney, Agent, or Firm* — Vivacqua Crane, PLLC

(57) ABSTRACT

A sump cover having a receptacle and an automatic drainage device disposed in the receptacle. The drainage device includes a base platform defining a valve opening in communication with an outlet of the receptacle, a support structure attached to the base platform, a valve stem assembly, and a float assembly. The support structure includes a guide portion defining a slot in alignment with the valve opening. The valve stem assembly is slidingly disposed in the slot and includes a sealing member for selectively closing the valve opening. The valve stem assembly is moveable into a closed position, sealing the valve opening, and moveable into an open position, unsealing the valve opening. The float assembly includes a pin to selectively lock the valve stem assembly in the closed position and releases the valve stem assembly to the open position when a certain amount of liquid is present in the receptacle.

20 Claims, 7 Drawing Sheets

AUTOMATIC DRAINAGE DEVICE FOR RADON MITIGATION SYSTEMS

FIELD

The present disclosure relates to sump covers for radon mitigation systems; particularly to sump covers having a drainage device for radon mitigation systems; and more particularly to an automatic drainage device for radon mitigation systems.

BACKGROUND

Radon is a naturally occurring colorless, odorless, and tasteless gas that is also radioactive. Radon has a chemical symbol Rn, atomic number 86, and is produced by the radioactive decay of radium-226. Radon gas is naturally released from rocks, soil, and water. In outdoor environments, radon gas levels are very low and generally not considered harmful. However, radon gas can get into houses or buildings through small cracks or holes in the foundations and can accumulate in the closed structures over time. The United States Environmental Protection Agency (EPA) considers radon gas to be second most frequent cause of lung cancer and recommends mitigation of radon gas in occupied buildings.

Radon enters a house through the lowest level in the house that is in contact with open ground. Typical entry points of radon into houses are cracks in solid foundations, construction joints, cracks in walls, gaps in suspended floors, gaps around service pipes, cavities inside walls, and the water supply. Soil suction systems are commonly used to mitigate radon infiltration into a building. Soil suction systems prevent radon gas from entering the house by drawing a partial vacuum from beneath the house and venting it through one or more pipes to the exterior environment. Soil suction systems typically involve one of four types of soil suction that includes sub-slab suction, drain tile suction, block wall suction, and sump hole suction.

Sump hole suction systems are common for houses with a basement having a sump pit since the sump pit is one of the main vectors for radon gas entering the house. The sump pit is hermetically sealed from the immediate ambient air surrounding the sump pit with a lid, also referred to as a sump cover. An opening is provided in the sump cover, a rubber seal is fitted into the opening, and a suction pipe in inserted through the seal to create a suction point. A mechanical device, such as a fan, is used to extract air from the sump pit through the suction point. The extracted air is exhausted to the external environment. This is done in order to extract radon gas from the soil beneath the house to minimize the radon gas entering the house. An advantage of extracting air from the sump pit is that the sump pit is in fluid communication with the existing drainage system beneath the basement floor and drainage tiles surrounding the house. This connection of drainage system and tiles provides a pressure field extension that enables the extraction of radon gas from the entire footprint of the house.

To ensure the maximum efficiency of radon gas removal from beneath the house, the sump cover is hermetically sealed to prevent internal air from the house from leaking into the sump pit. In older houses, this would include hermetically sealing of all open floor drains leading to the sump pit. A draw back from sealing the sump cover and internal floor drains is that of undesired liquids accumulation within the basement of the house. Such liquids may be the result of unfortunate events such as ground water infiltration into the basement due to a failed sump pump, a break in the house water line, or gray water backup from a sewer line.

Thus, while sump hole suction radon mitigation systems achieve their intended purpose, there is a need for an automatic drainage device that is easily installable to mitigate potential liquid accumulation surrounding the sump cover.

SUMMARY

According to several aspects, an automatic drainage device is disclosed. The automatic drainage device includes a base platform defining a valve opening, a support structure attached to a first surface of the base platform and includes a guide portion defining an aperture axially aligned with the valve opening, an elongated member slidingly inserted through the aperture and supported by the guide portion such that the elongated member is axially aligned with the valve opening, a pivot body having a locking pin insertable into a pin bore of the elongated member to lock the elongated member in a closed position, and a floatable body attached to the pivot body. A sealing member is attached to the first end of the elongated member. A handle is attached to the second end of the elongated member. The elongated member is moveably guided by the aperture to an open position such that the sealing member is spaced from the valve opening and to the closed position such that the sealing member is sealing the valve opening. The pin bore is defined between the first end and the second end of the elongated body. The pivot body is pivotable in a first pivot direction to retract the locking pin out of the pin bore thereby releasing the elongated member to the open position. The floatable body is operable to pivot the pivot body in the first pivot direction in response to a liquid acting on the floatable body, thereby releasing the elongated member to the open position.

In an additional aspect of the present disclosure, the aperture is a slot opening and the pivot body includes a block portion and a pair of parallel arms extending from the block portion. The pair of parallel arms are pivotally attached to the support structure on either side of the slot opening.

In another aspect of the present disclosure, the automatic drainage device further includes a connecting rod having a first distal end and a second distal end spaced from the first distal end. The first distal end is connected to the pivot body and the second distal end is attached to the floatable body. The first distal end of the connecting rod extends through the pivot body and functions as the locking pin.

In another aspect of the present disclosure, the base platform includes a connector portion extending from the second surface and surrounding the valve opening, and a valve seat is defined on the second surface between the valve opening and the connector portion. The sealing member is engageable with the valve seat to hermetically seal the valve opening.

In another aspect of the present disclosure, the sealing member includes a disk-shaped body having an annular mating surface engageable with the valve seat, and a raised portion extending from the disk-shaped body. The raised portion includes a beveled surface facing the valve opening. The sealing member is connected to the first end of the elongated member in such a way that disk-shape body is capable of a wobbly movement with respect to the elongated member.

In another aspect of the present disclosure, the connector portion includes an external surface defining a form factor complementary to a shape of an outlet and sized to provide an interference fit with the outlet to provide a hermetic seal.

In another aspect of the present disclosure, the automatic drainage device further includes a sump cover defining a receptacle including an outlet having a predetermined shape. The connector portion includes an external surface defining a form factor complementary to the predetermined shape of the outlet and sized to provide an interference fit with the receptacle to provide a hermetic seal. The sump cover further defines a channel extending from a peripheral surface of the sump cover to the receptacle.

According to several aspects, an automatic drainage cover is disclosed. The automatic drainage cover includes a sump cover defining a receptacle having an inlet, an outlet, and an interior surface defining a chamber containing a drainage device. The drainage device includes a base platform defining a valve opening in communication with the outlet of the receptacle and includes a valve seat surrounding the valve opening; a support structure attached to the base platform in which the support structure includes a guide portion defining an aperture aligned with the valve opening; a valve stem assembly slidingly disposed in the aperture and includes a sealing member engageable to the valve seat to close the valve opening and a pin bore, in which the valve stem assembly is moveable into a closed position such that the sealing member is engaged to the valve seat and moveable into an open position such that the sealing member is spaced from the valve seat; and a float assembly having a locking pin insertable into the pin bore of the valve stem assembly to selectively retain the valve stem assembly in the closed position.

In an additional aspect of the present disclosure, the valve stem assembly further includes an elongated member having a first end attached to the sealing member and a second end opposite the first end. The pin bore is defined between the first end and the second end. A handle is attached to the second end of the elongated member. The elongated member is axially aligned with the valve opening. The valve stem assembly is moveable into the open position under an urging of gravity.

In another aspect of the present disclosure, the float assembly includes a pivot body pivotally attached to the support structure, a floatable body spaced from the pivot body, and a connecting rod connecting the pivot body to the floatable body.

In another aspect of the present disclosure, the aperture is a slot opening and the pivot body includes block portion and a pair of parallel arms extending from the block portion. The pair of parallel arms are pivotally attached to the support structure on either side of the slot opening. The connecting rod includes a first distal end extending through the block portion defining the locking pin.

In another aspect of the present disclosure, the floatable body is liftable by a liquid, thereby causing the connecting rod to pivot the pivot body in a first pivot direction to disengage the locking pin from the pin bore of the elongated member.

In another aspect of the present disclosure, the base platform includes a bottom surface facing away from the support structure, a connector portion extending from the bottom surface and surrounding the valve opening, and the valve seat is defined on the bottom surface between the valve opening and the connector portion. The sealing member is engageable with the valve seat to hermetically seal the valve opening.

According to several aspects, a drainage device is disclosed. The drainage device includes a base platform, a disk-shaped plug, a flat rectangular bar, a spider frame, a pivot body, floatable body, and a connecting rod. The base platform includes a top surface, a bottom surface, and a valve opening. The bottom surface includes a connector portion surrounding the valve opening and a valve seat between the connector portion and the valve opening. The disk-shaped plug is engageable to the valve seat to hermetically seal the valve opening. The flat rectangular bar includes a first end attached to the disk-shaped plug, a second end having a handle, and a pin bore defined between the first end and the second end. The spider frame is attached to the top surface of the base platform. The spider frame includes a guide portion defining a slot opening axially aligned with the valve opening. The flat rectangular bar is slidably inserted through the slot opening. The flat rectangular bar is moveable to a closed position such that the disk-shaped plug is engaged to the valve seat and moveable to an open position away from the bottom surface such that the disk-shaped plug is spaced from the valve seat. The pivot body includes a block portion and a pair of arms extending from the block portion. The pair of arms are pivotally attached to the spider frame on either side of the slot opening. The connecting rod includes a first distal end and a second distal end opposite the first distal end. The first distal end is inserted through the block portion of the pivot body to define a locking pin insertable into the pin bore to lock the flat rectangular bar in the closed position. The floatable body is attached to the second distal end of the connecting rod. The floatable body is liftable by a liquid, thereby pivoting the pivot body to retract the locking pin from the pin bore to release the flat rectangular bar into the open position.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of the particular features. The specific structural and functional details disclosed are not intended to be interpreted as limiting, but as a representative basis for teaching one skilled in the art as to how to practice the disclosed concepts.

Figure 1:
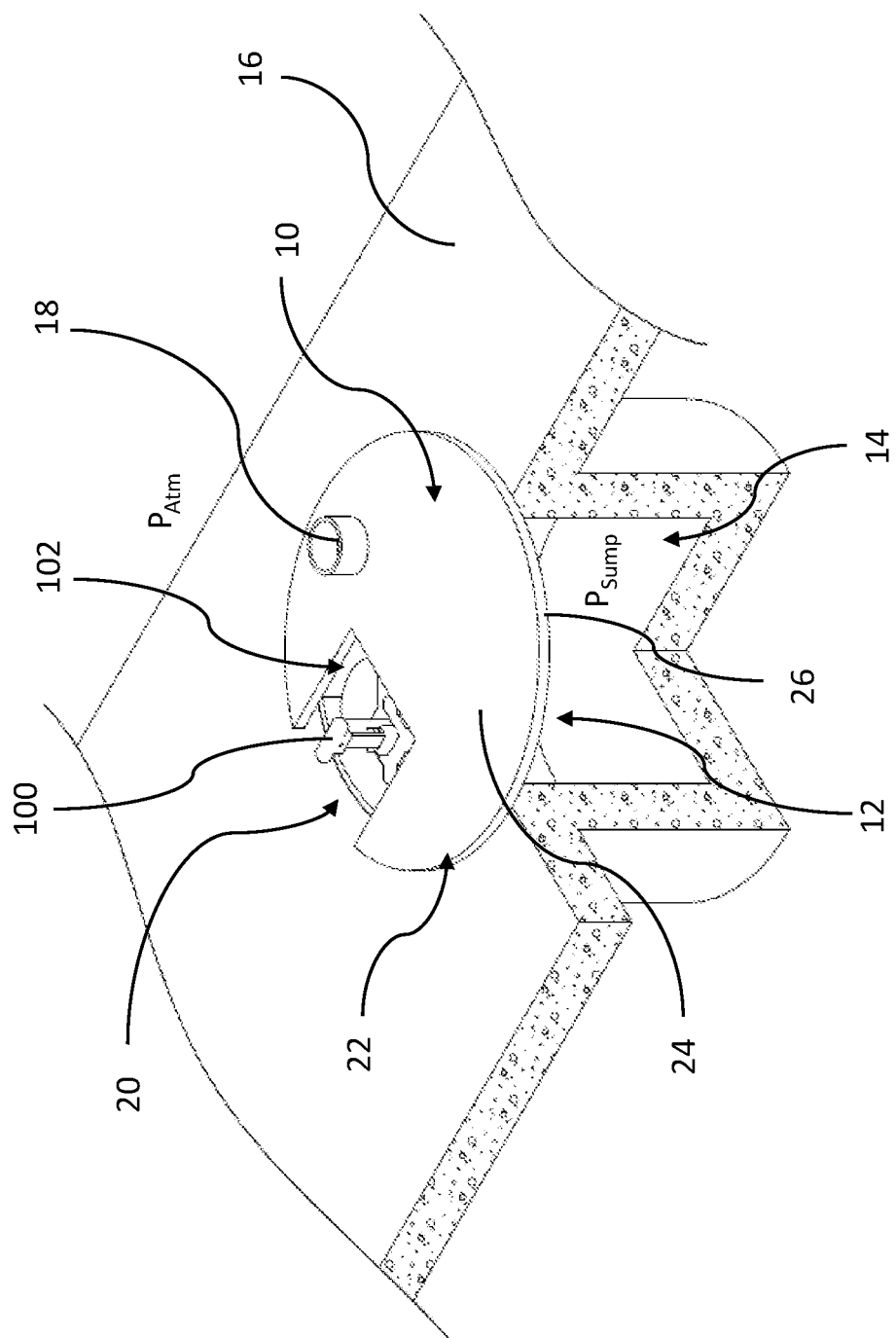
FIG. 1 is a perspective view of a sump cover having an automatic drainage device, according to an exemplary embodiment.

FIG. 1 shows a sump cover 10 having an automatic drainage device 100. The sump cover 10 is configured to seal an opening 12 of a sump pit 14. The sump cover 10 and sump pit 14 are part of a sump hole suction radon mitigation system configured to extract radon gas from the soil beneath a building. A gasket (not shown) is disposed between the mating surfaces of the sump cover 10 and the building floor 16 to provide a hermetic seal between the sump pit 14 and the ambient air surrounding the sump cover 10.

A suction pipe 18 is inserted through the sump cover 10 to provide a suction point for a mechanical device such as a fan (not shown) to extract air containing radon gas from the soil beneath the building floor 16 via the sump pit 14, thus creating a low-pressure space ($P_{sump}$) in the sump pit 14 with respect to the ambient air pressure ($P_{atm}$) surrounding the exterior of the sump cover 10. Ambient air pressure ($P_{atm}$), also referred to as atmospheric pressure, is typically about 14.7 Pounds Per Square Inch Absolute (PSIA) at sea level. Typical sump hole suction radon mitigation systems operate at a negative pressure differential of 0.5 to 2 inches of water with respect to atmospheric pressure. The air within the sump pit 14 together with any radon gas extracted from the sump pit 14 is vented to the ambient atmosphere outside of the building.

The automatic drainage device 100 is disposed within a receptacle 102 defined in the sump cover 10. The sump cover 10 includes a channel 20 extending from a peripheral surface 22 of the sump cover 10 to the receptacle 102. The channel 20 directs any standing liquid on the building floor 16 immediately adjacent the sump cover 10 to the receptacle 102. The automatic drainage device 100 is configured to automatically open a valve to allow for fluid communication between the sump pit 14 and the ambient air surrounding the sump cover 10 when a certain amount of liquid is present in the receptacle 102, thus enabling the liquid to drain into the sump pit 14.

Figure 2:
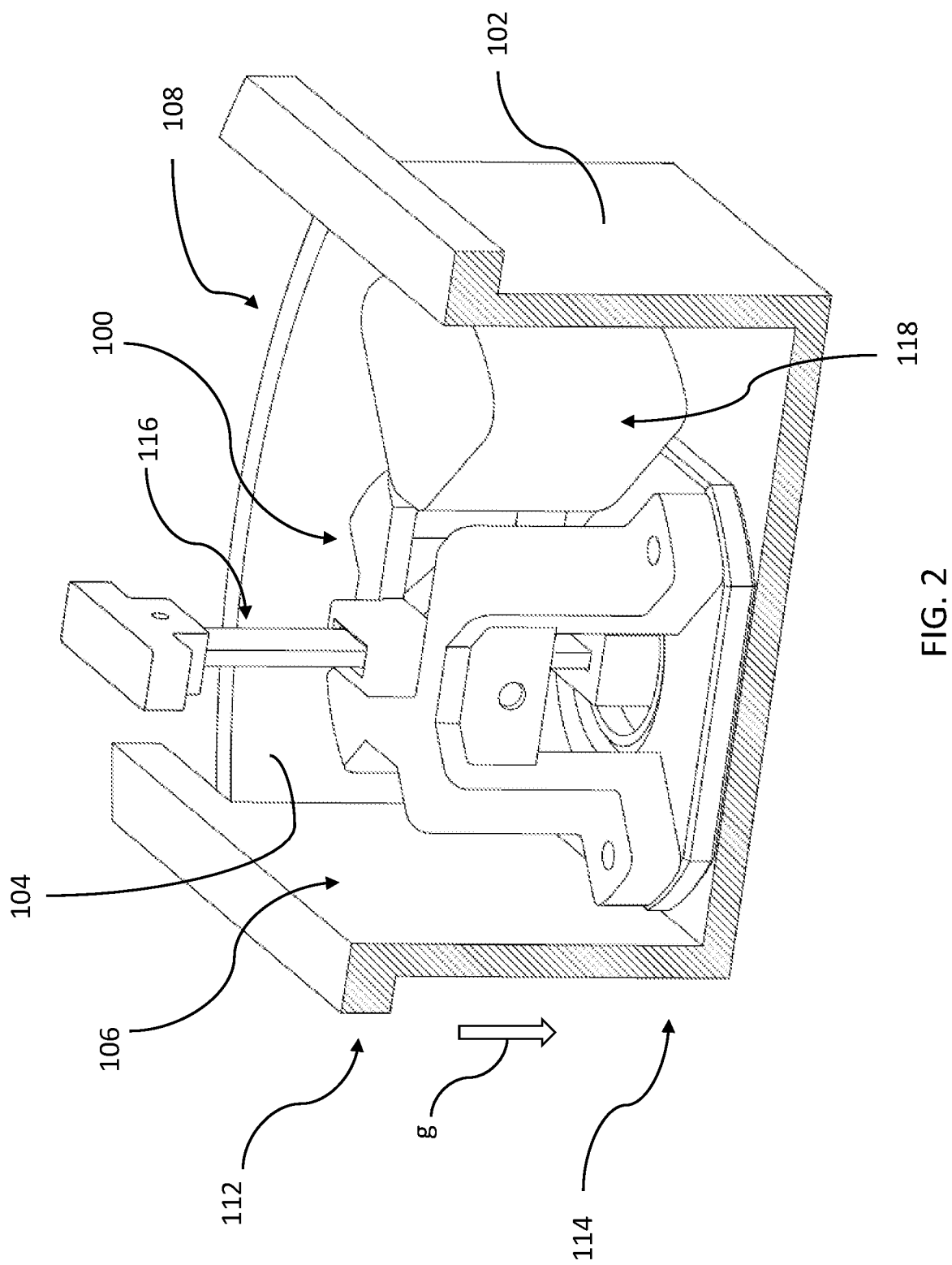
FIG. 2 is a cutaway perspective view of a receptacle having the automatic drainage device of FIG. 1, according to an exemplary embodiment.
Figure 3:
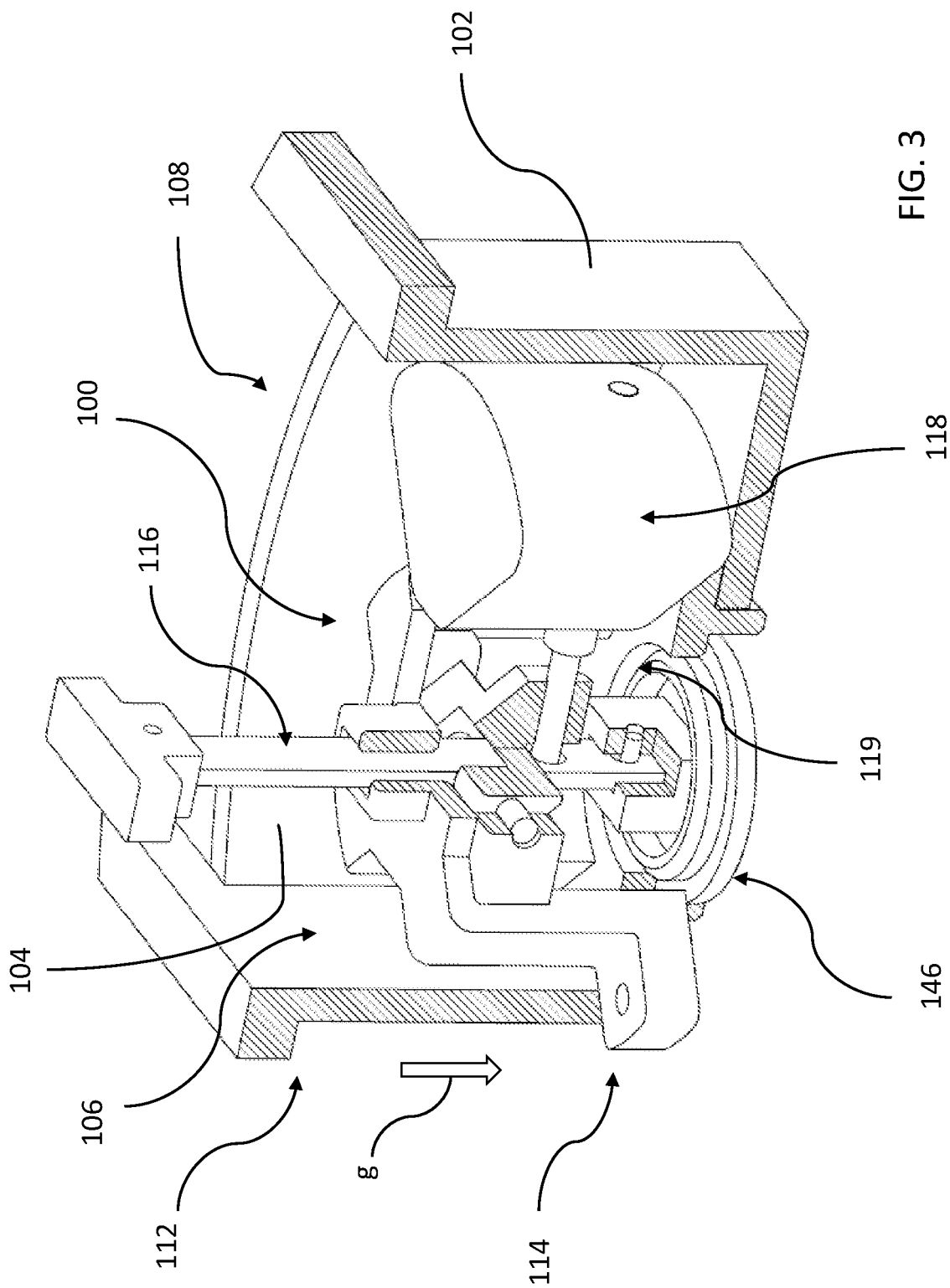
FIG. 3 is a cutaway perspective view of the automatic drainage device in a closed state within the receptacle, according to an exemplary embodiment.

FIG. 2 shows a cutaway perspective view of the receptacle 102 containing the automatic drainage device 100 of FIG. 1. FIG. 3 shows a cutaway perspective view of the automatic drainage device 100 within the receptacle 102. For brevity, the automatic drainage device 100 is also referred to as the drainage device 100 or device 100. Referring to both FIGS. 2 and 3, the receptacle 102 includes an interior surface 104 defining a chamber 106 for receiving a fluid such as a liquid. The receptacle 102 includes an inlet 108 for conveying the liquid into the chamber 106 and an outlet 119 connected to the drainage device 100 for releasing the liquid out of the chamber 106. In a non-limiting example, the inlet 108 is located in an upper portion 112 of the receptacle 102 and the outlet 119 is located in a lower portion 114 of the receptacle 102. The terms "upper" and "lower" are used with respect to the general direction of gravity (g).

The receptacle 102 may be part of the sump cover 10 as described above or a freestanding receptacle 102. In one embodiment, the receptacle 102 is integrally formed in the sump cover 10 by manufacturing methods such as injection molding or vacuum forming of a polymer plastic. In another embodiment, an opening may be created through the sump cover 10 and a freestanding receptacle 102 may be inserted through the opening such that the inlet 108 is positioned on the exterior surface 24 of the sump cover 10 and the outlet 119 is positioned on the interior surface 26 of the sump cover 10 facing the sump pit 14. The freestanding receptacle 102 may be manufactured of a metallic material by casting, stamping, folding, assembling and joining of multiple work pieces, and other known manufacturing techniques. The freestanding receptacle 102 may also be manufactured of a plastic or composite material by injection molding, vacuum forming, additive manufacturing such as 3-D printing, and other known manufacturing techniques.

Figure 4:
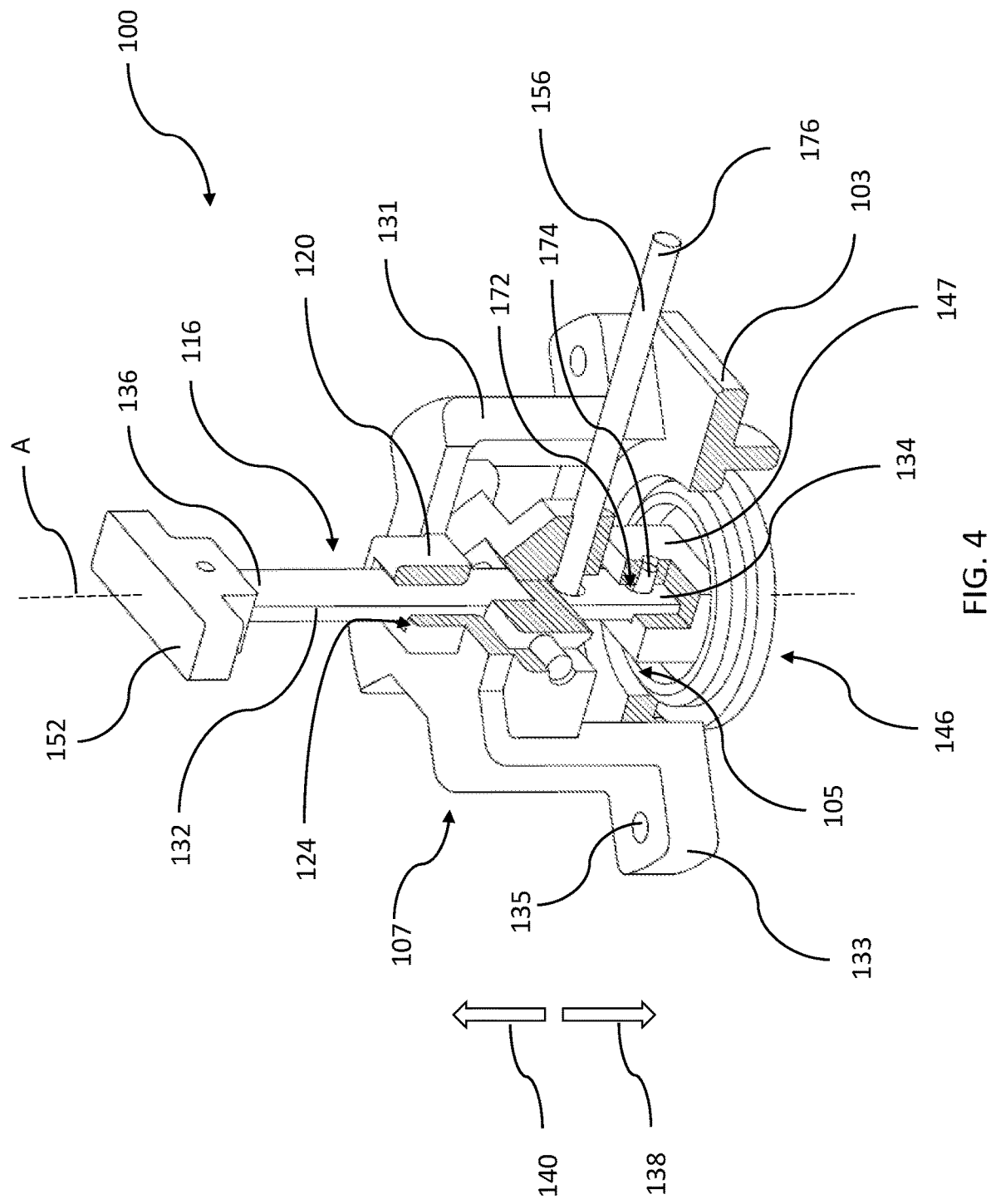
FIG. 4 is a cutaway perspective view of the automatic drainage device in the closed state, according to an exemplary embodiment.
Figure 5:
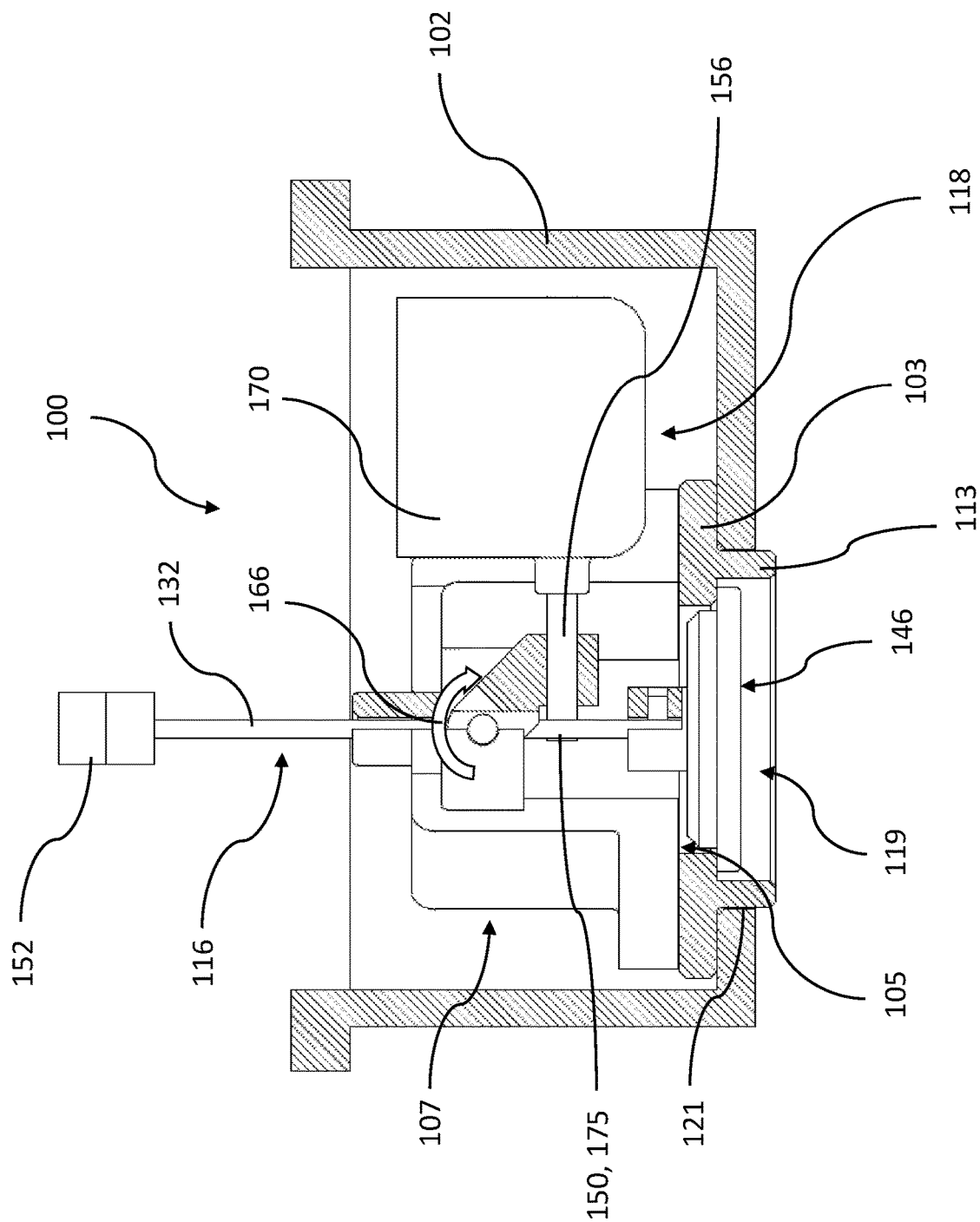
FIG. 5 is a cutaway side view of the automatic drainage device in the closed state within the receptacle, according to an exemplary embodiment.
Figure 6:
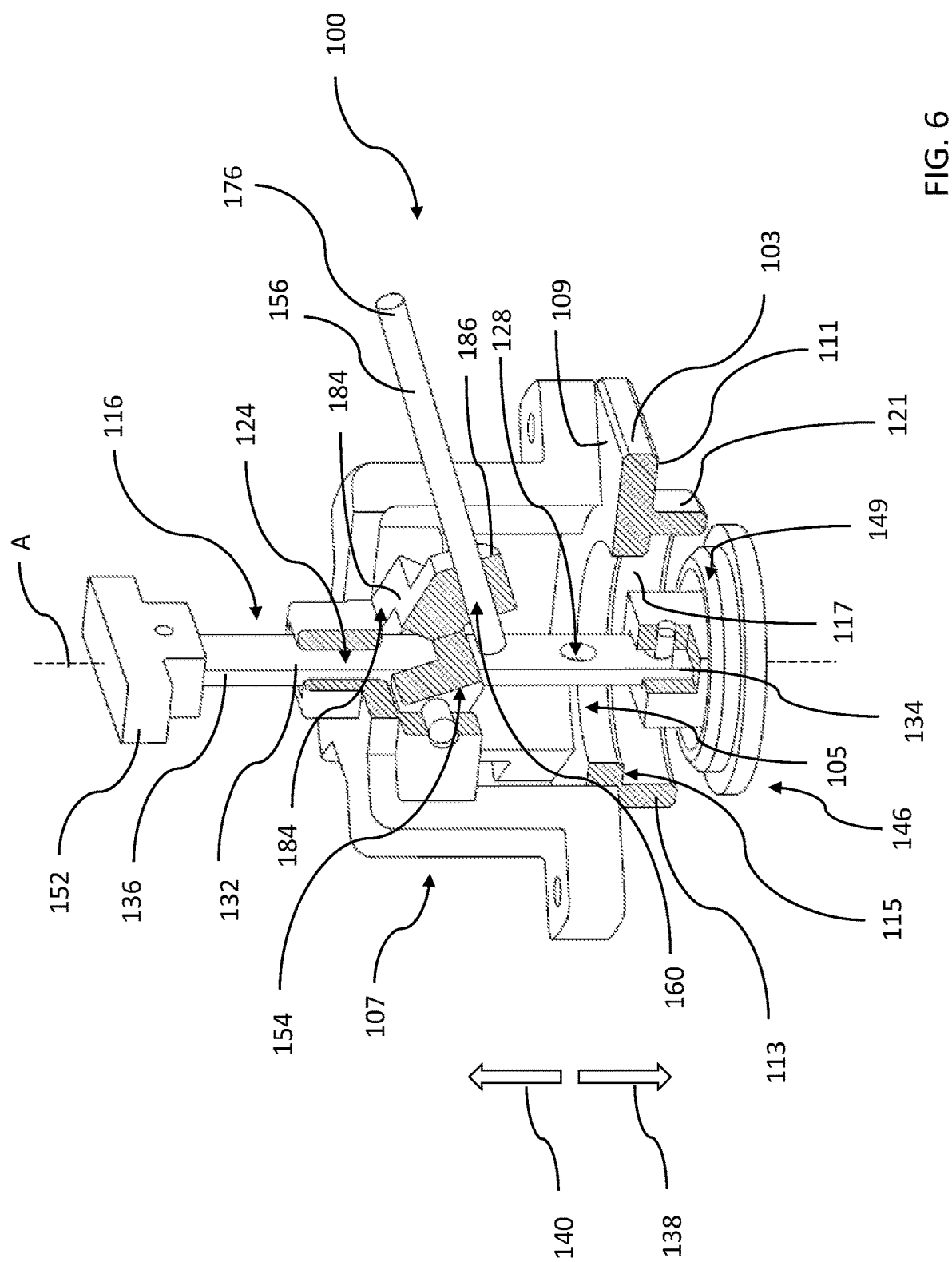
FIG. 6 is a cutaway perspective view of the automatic drainage device in an open state, according to an exemplary embodiment.
Figure 7:
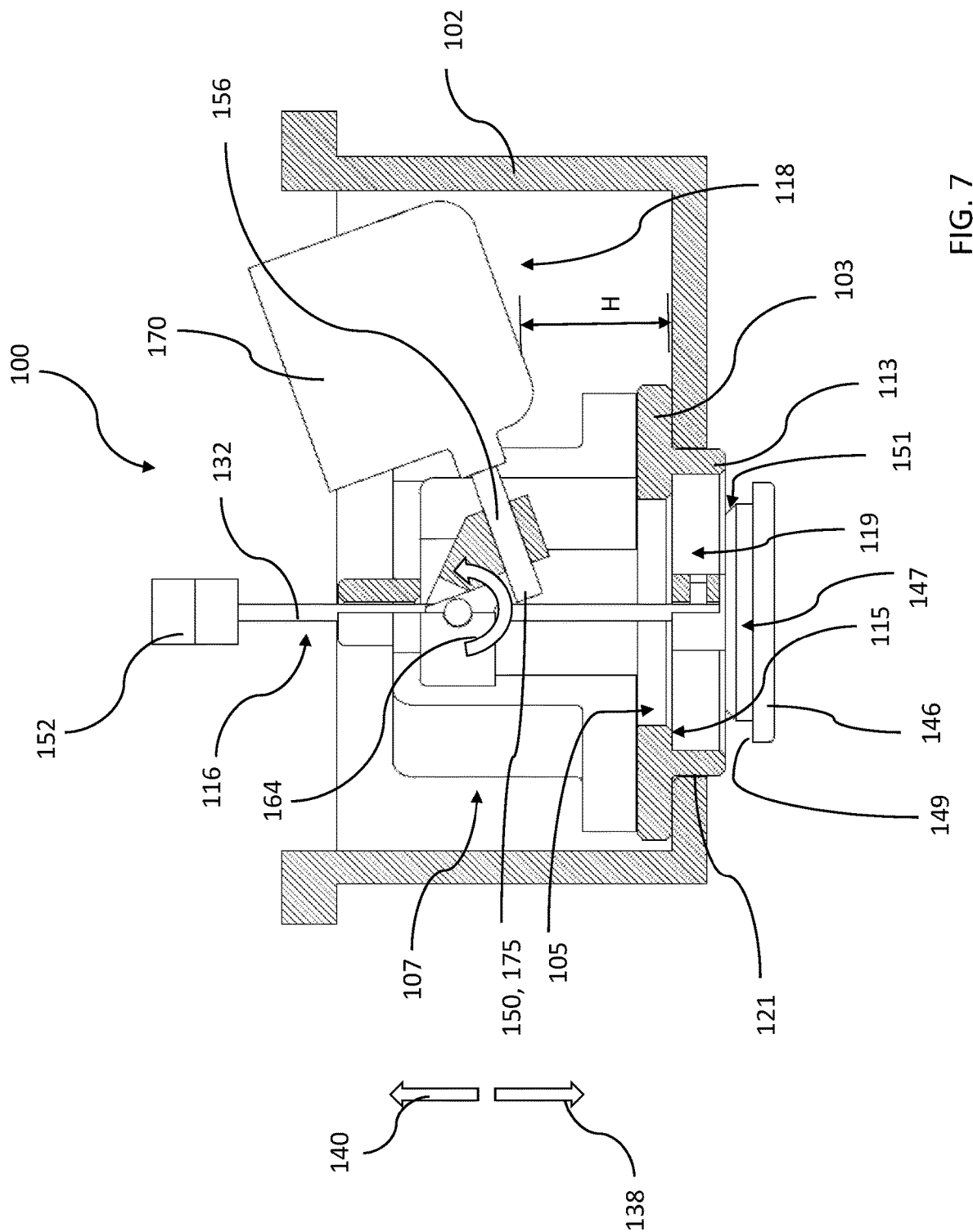
FIG. 7 is a cutaway side view of the automatic drainage device in the open state within the receptacle, according to an exemplary embodiment.

FIG. 4 and FIG. 5 show a cutaway perspective view and a cutaway side view of the automatic drainage device 100 in a closed state, respectively. FIG. 6 and FIG. 7 show a cutaway perspective view and a cutaway side view of the automatic drainage device 100 in an open state, respectively. The open state means a valve opening 105 of the drainage device 100 is unsealed, or open, to allow a liquid to pass through. The closed state means the valve opening 105 is sealed, or closed.

Referring to FIGS. 4 through 7, the drainage device 100 includes a base platform 103 defining the valve opening 105, a support structure 107 mounted onto the base platform 103, a valve stem assembly 116 slidingly connected to and guided by the support structure 107, and a float assembly 118 operable to selectively retain the valve stem assembly 116 in a closed position and release the valve stem assembly 116 into an open position based on a level of liquid (H) contained in the receptacle 102. For clarity of illustration and description, the floatable body 170 and the receptacle 102 are not shown in FIGS. 4 and 6.

The valve stem assembly 116 includes an elongated member 132 having a sealing member 146, such as a plug 146, on one end 134 for sealing the valve opening 105 and a handle 152 on the opposite end 136. The valve stem assembly 116 in the closed position means the valve stem assembly 116 is in a position such that valve opening 105 is sealed by the sealing member 146. The valve stem assembly 116 in the open position means the valve stem assembly 116 is in a position such that the sealing member 146 is spaced from the valve opening 105 thus unsealing the valve opening 105.

The valve stem assembly 116 is retained, also referred to as locked, in the closed position to seal the valve opening 105 during normal operating conditions of the radon mitigation system, during which ($P_{sump}$) is less than ($P_{atm}$), and remains in the closed position in the absence of a predetermined amount of liquid in the receptacle 102. When a predetermined amount of liquid is present in the receptacle 102, the float assembly 118 releases, also referred to as unlocks, the valve stem assembly 116 and allows the valve stem assembly 116 to slidingly move under its own weight to the open position to unseal the valve opening 105 to facilitate drainage of the liquid from the receptacle 102.

Best shown in FIG. 6, the base platform 103 includes a first or top surface 109, a second or bottom surface 111 opposite the top surface 109, and a connector portion 113 extending from the bottom surface 111 and surrounding the valve opening 105. An annular valve seat 115 is defined on the bottom surface 111 between the valve opening 105 and an interior surface 117 of the connector portion 113. As a non-limiting example, the connector portion 113 includes an exterior surface 121 defining a substantially cylindrical form factor capable of being inserted into a receptacle 102 having a circular outlet 119 or a drainage pipe having a circular cross-section. Best shown in FIGS. 5 and 7, the base platform 103 is assembled to the receptacle 102 by inserting the connector portion 113 through the outlet 119 of the receptacle 102. The exterior surface 121 of the connector portion 113 defines a form factor complementary to the shape of the outlet 119 and sized to provide an interference fit with the receptacle 102 to provide a hermetic seal. Once assembled, the valve opening 105 is in fluid communication with the outlet of the receptacle 102 when the valve stem assembly 116 is in the open position as shown in FIGS. 6 and 7.

Best shown in FIG. 4, the support structure 107 is mounted onto the top surface 109 of the base platform 103. The support structure 107 may be that of a spider frame 107 having a plurality of legs 131. At least one or more legs 131 include a foot 133 mounted to the base platform 103 with fasteners 135 such as pins, screws, bolts, studs, and/or nuts. The foot 133 may also be welded or chemically bonded to the top surface 109 of the base platform 103. The support structure 107 includes a guide portion 120 defining an aperture 124 that is axially aligned with the center of the valve opening 105 along an axis A. The aperture 124 is a through-hole having a shape of a cross-section of the elongated member 132.

Best shown in FIG. 6, the elongated member 132 includes a first end 134, also referred to as a lower end 134, and a second end 136, also referred to as an upper end 136, opposite the first end 134. A pin bore 128 is defined in the elongated member 132 between lower end 134 and the upper end 136. The pin bore 128 is configured to receive a locking pin 150 to lock the valve stem assembly 116 in the closed position. The elongated member 132 is slidingly disposed in the aperture 124. The aperture 124 is sized to cooperate with the elongated member 132 to support the elongated member 132 in axial alignment with the valve opening 105 and allows for the elongated member 132 to freely move in a first direction 138, shown as a downward direction 138, and in a second direction 140 opposite the first direction 138, shown as an upward direction 140.

In the non-limiting example shown, the elongated member 132 is a flat rectangular bar 132 and the aperture 124 is a slot opening 124, having a rectangular shaped through-hole, sized to slidingly support the flat rectangular bar 132 in alignment with the valve opening 105. The elongated member 132, or flat rectangular bar 132, is slidably disposed within the aperture 124, or slot opening 124. The guide portion 120 supports the elongated member 132 in axial alignment with the valve opening 105. Moving the elongated member 132 in the first direction 138 places the valve stem assembly 116 into the open position in which the first end 134 of the elongated member 132 is extended through the valve opening 105 away from the base platform 103. Moving the elongated member 132 in the second direction 140 places the valve stem assembly 116 into the closed position in which the first end 134 of the elongated member 132 is retracted back through the valve opening 105 toward the support structure 107.

Referring back to FIG. 4, a handle 152 is connected to the second end 136 of the elongated member 132 to manually move the elongated member 132 in the second direction 140. A sealing member 146 such as a disk-shaped plug 146 is attached to the lower end 134 of the moveable elongated member 132. The lower end 134 of the elongated member 132 defines an attachment pin hole 172. A pin 174 is inserted through the attachment pin hole 172 to attach the plug 146 to the elongated member 132. The diameter of the attachment pin hole 172 is larger than the diameter of the pin 174 to allow for a sinusoidal type of movement, also known as a wobbly movement, of the plug 146 about the lower end 134 of the elongated member 132.

Best shown in FIG. 7, the plug 146 includes a disk-shaped body having an annular mating surface 149 operable to cooperate with the annular valve seat 115 to provide a hermetic seal. The plug 146 includes a raised portion 147 having a beveled surface 151 facing the valve opening 105. In response to the elongated member 132 being moved in the second direction 140 to place the valve stem assembly 116 in the closed position, the beveled surface 151 cooperates with the wobbly movement of the plug 146 to facilitate the guiding and seating of the plug 146 in such a way that the annular mating surface 149 is engaged to the annular valve seat 115 to close the valve opening 105.

The float assembly 118 includes a floatable body 170, a pivot body 154 spaced from the floatable body 170, and a connecting rod 156 connecting the floatable body 170 to the pivot body 154. The pivot body 154 is pivotally attached to the support structure 107. The floatable body 170 includes a density that is less than the density of the liquid that is intended to activate the drainage device 100. For example, for the drainage of a liquid such as water, the density of the floatable body 170 is preferably less than 0.9 g/cm$^3$ at room temperature. The floatable body 170 may be formed of a hollow blow-molded plastic shell, a low-density closed cell foam, a natural cork material, and other materials having a density less than the density of the activating liquid.

Best shown in FIG. 6, the pivot body 154 includes a U-shaped portion 182 having a pair of arms 184 extending from a block portion 186. The pair of arms 184 are pivotally attached to the support structure 107 on either side of the slot opening 124. A benefit of this arrangement of the pivot body 154 is that the valve stem assembly 116 will remain locked in the closed position even under a vacuum acting on the sealing plug 146 when the locking pin 150 is inserted in the pin bore 128.

The block portion 186 of the pivot body 154 defines a through-hole 160 to receive the connecting rod 156. A first distal end 177 of the connecting rod 156 is inserted through the through-hole 160 and extends from the block portion 186 to function as the locking pin 150, which is receivable in the pin bore 128 of the elongated member 132. A second distal end 176 of the connecting rod 156 is attached to the floatable body 170. The pivot body 154 is pivotable in a first pivot direction 164 (unlocking), which is shown as a counter-clockwise direction 164 in FIG. 7, and an opposite second pivot direction 166, which is shown as clockwise direction 166 (locking) in FIG. 5 based on the position of the floatable body 170.

The block portion 186 of the pivot body 154 and connecting rod 156 may be formed of a material sufficiently heavy such that the pivot body 154 naturally pivots in the second (closing) pivot direction 166 in the absence of a force urging the pivot body 154 to pivot in the opposite first (opening) pivot direction 164. Example of such material may include a high-density plastic, metal alloys, or composite materials.

Referring to FIGS. 4 and 5, during normal operating conditions of the radon mitigation systems and the chamber 106 is substantially free of liquid, the valve stem assembly 116 is locked in the closed position by the locking pin 150 received in the pin bore 128 of the elongated member 132. Referring to FIGS. 6 and 7, the floatable body 170 is lifted by the liquid in responds to a certain amount of liquid accumulating in the chamber 106 above a predetermined height (H). The lifting of the floatable body 170 causes the connecting rod 156 to rotate the pivot body 154 in the first pivot direction 164, which in turn retracts the locking pin 150 from the pin bore 128. The retracting of the locking pin 150 releases the elongated member 132 in the first direction 138 under the urging of gravity, thus moving the plug 146 in an outward direction away from the valve seat 115 to allow for the liquid to drain out of the valve opening 105. The drainage device 100 may be reset to the closed position by pulling the handle 152 to move the elongated member 132 in the second direction 140 so that the locking pin 150 is reinserted into the pin bore 128, thus locking the valve stem assembly 116 in the closed position.

A main benefit of the device 100 is that it mechanically locks the valve stem assembly 116 in a closed position without concern for the pressure differential between $P_{(atm)}$ and $P_{(sump)}$. Another benefit of the device 100 is that it automatically unlocks the valve stem assembly 116 to allow for drainage once a certain amount of liquid has been accumulated in the receptacle 102. Yet another benefit of the device 100 is that it is easily resettable by a simple pull of the handle without having to remove the device 100 from the sump cover 10 or drain pipe. Still yet another benefit of the device 100 is the adaptability to connect to various receptacle outlets by modifying the form factor of the connector portion 113. Still yet another benefit of the device 100 is the scalability of the device 100 for various applications such as hermetically sealing a floor drain in the absent of a liquid and unsealing the floor drain when a level of liquid is sufficient to unlock the valve stem assembly 116. Still yet another benefit is that the device 100 may function as a back flow preventor to prevent the backflow of a pressurized liquid or gas from the sump pit 14 or floor drain when the device 100 is locked in the closed position.

While example embodiments have been presented in the foregoing detailed description, it should be appreciated that variations of these embodiments can exist without departing from the spirit and scope of the invention. The embodiments described herein are not intended to limit the scope, applicability, or configuration of the invention. Rather, the detailed description provides sufficient detail to enable one skilled in the art to make and use the invention. Those skilled in the art will perceive applications, improvements, changes, and modifications to the invention. Such applications, improvements, changes, and modifications within the skill of the art are intended to be covered by the appended claims.

We claim:

1. An automatic drainage device, comprising:
a base platform having a first surface, a second surface, and a valve opening;
a support structure attached to the first surface of the base platform, wherein the support structure includes a guide portion defining an aperture axially aligned with the valve opening;
an elongated member slidingly inserted through the aperture and supported by the guide portion such that the elongated member is axially aligned with the valve opening, wherein the elongated member includes a first end, a second end opposite the first end, and a pin bore defined between the first end and the second end;
a sealing member attached to the first end, wherein the elongated member is moveable to an open position such that the sealing member is spaced from the valve opening and moveable to a closed position such that the sealing member is sealing the valve opening;
a pivot body having a locking pin selectively insertable into the pin bore of the elongated member to lock the elongated member in the closed position, wherein the pivot body is pivotable in a first pivot direction to retract the locking pin out of the pin bore thereby releasing the elongated member to move into the open position; and
a floatable body attached to the pivot body, wherein the floatable body is operable to pivot the pivot body in the first pivot direction in response to a liquid acting on the floatable body.

2. The automatic drainage device of claim 1, wherein:
the aperture is a slot opening; and
the pivot body includes a block portion and a pair of arms extending from the block portion, wherein the pair of arms are pivotally attached to the support structure on either side of the slot opening.

3. The automatic drainage device of claim 2, a handle attached to the second end of the elongated member.

4. The automatic drainage device of claim 2, further comprising a connecting rod having a first distal end and a second distal end spaced from the first distal end, wherein the first distal end is connected to the pivot body and the second distal end is attached to the floatable body.

5. The automatic drainage device of claim 4, wherein the first distal end of the connecting rod extends through the pivot body and functions as the locking pin.

6. The automatic drainage device of claim 1, wherein the base platform includes:
a connector portion extending from the second surface and surrounding the valve opening; and
a valve seat between the valve opening and the connector portion; and
wherein the sealing member is engageable with the valve seat to hermetically seal the valve opening.

7. The automatic drainage device of claim 6, wherein the sealing member includes:
a disk-shaped body having an annular mating surface engageable with the valve seat;
a raised portion extending from the disk-shaped body, wherein the raised portion includes a beveled surface facing the valve opening; and
wherein the sealing member is connected to the first end of the elongated member in such a way that disk-shape body is capable of a wobbly movement with respect to the first end of the elongated member.

8. The automatic drainage device of claim 7, wherein the connector portion includes an external surface defining a form factor complementary to a shape of an outlet and sized to provide an interference fit with the outlet to provide a hermetic seal.

9. The automatic drainage device of claim 6, further comprising a sump cover comprising a receptacle including an outlet having a predetermined shape; and
wherein the connector portion includes an external surface defining a form factor complementary to the predetermined shape of the outlet and sized to provide an interference fit with the receptacle to provide a hermetic seal.

10. The automatic drainage device of claim 9, wherein the sump cover further comprises a channel extending from a peripheral surface of the sump cover to the receptacle.

11. An automatic drainage cover, comprising:
a sump cover comprising a receptacle having an inlet, an outlet, and an interior surface defining a chamber;
a drainage device disposed in the chamber, wherein the drainage device comprises:
a base platform having a valve opening in communication with the outlet of the receptacle, and a valve seat surrounding the valve opening;

a support structure attached to the base platform, wherein the support structure includes a guide portion defining an aperture axially aligned with the valve opening;

a valve stem assembly slidingly disposed through the aperture and includes a sealing member engageable to the valve seat to close the valve opening and a pin bore, wherein the valve stem assembly is moveable into a closed position such that the sealing member is engaged to the valve seat and moveable into an open position such that the sealing member is spaced from the valve seat; and a float assembly having a locking pin selectively insertable into the pin bore of the valve stem assembly to retain the valve stem assembly in the closed position.

12. The automatic drainage cover of claim 11, wherein the valve stem assembly further includes an elongated member having a first end attached to the sealing member and a second end opposite the first end, and wherein the pin bore is defined between the first end and the second end.

13. The automatic drainage cover of claim 12, wherein the valve stem assembly further includes a handle attached to the second end of the elongated member.

14. The automatic drainage cover of claim 12, wherein the valve stem assembly is moveable into the open position under an urging of gravity.

15. The automatic drainage cover of claim 14, wherein the base platform includes:

a bottom surface facing away from the support structure; and a connector portion extending from the bottom surface and surrounding the valve opening; and wherein the valve seat is defined on the bottom surface between the valve opening and the connector portion, and wherein the sealing member is engageable with the valve seat to hermetically seal the valve opening.

16. The automatic drainage cover of claim 14, wherein the float assembly includes a pivot body pivotally attached to the support structure, a floatable body spaced from the pivot body, and a connecting rod connecting the pivot body to the floatable body.

17. The automatic drainage cover of claim 16, wherein:

the aperture is a slot opening;

the pivot body includes a block portion and a pair of parallel arms extending from the block portion; and the pair of parallel arms are pivotally attached to the support structure on either side of the slot opening.

18. The automatic drainage cover of claim 17, wherein the connecting rod includes a first distal end extending through the block portion defining the locking pin.

19. The automatic drainage cover of claim 18, wherein the floatable body is liftable by a liquid to cause the connecting rod to pivot the pivot body in a first pivot direction to retract the locking pin from the pin bore of the elongated member.

20. A drainage device comprising:

a base platform having a top surface, a bottom surface, and a valve opening, wherein the bottom surface includes a connector portion surrounding the valve opening and a valve seat between the connector portion and the valve opening;

a disk-shaped plug engageable to the valve seat to hermetically seal the valve opening;

a flat rectangular bar having a first end attached to the disk-shaped plug, a second end having a handle, and a pin bore defined between the first end and the second end;

a spider frame attached to the top surface of the base platform, wherein the spider frame includes a guide portion defining a slot opening axially aligned with the valve opening, wherein the flat rectangular bar is slidably inserted through the slot opening, and wherein the flat rectangular bar is moveable to a closed position such that the disk-shaped plug is engaged to the valve seat and moveable to an open position such that the disk-shaped plug is spaced from the valve seat;

a pivot body having a block portion and a pair of arms extending from the block portion, wherein the pair of arms are pivotally attached to the spider frame on either side of the slot opening;

a connecting rod having a first distal end and a second distal end opposite the first distal end, wherein the first distal end is inserted through the block portion of the pivot body to define a locking pin insertable into the pin bore to lock the flat rectangular bar in the closed position; and a floatable body attached to the second distal end of the connecting rod, wherein the floatable body is liftable by a liquid, thereby pivoting the pivot body to retract the locking pin from the pin bore to release the flat rectangular bar into the open position.

\* \* \* \* \*